Dec. 3, 1968 R. W. LUCKY 3,414,845

AUTOMATIC EQUALIZER FOR DIGITAL TRANSMISSION SYSTEMS
UTILIZING ERROR CONTROL INFORMATION

Filed Sept. 28, 1965 3 Sheets-Sheet 1

INVENTOR
R. W. LUCKY

BY J. P. Kearns

ATTORNEY

United States Patent Office 3,414,845
Patented Dec. 3, 1968

3,414,845
AUTOMATIC EQUALIZER FOR DIGITAL TRANSMISSION SYSTEMS UTILIZING ERROR CONTROL INFORMATION

Robert W. Lucky, Red Bank, N.J., assignor to Bell Telephone Laboratories, Incorporated, New York, N.Y., a corporation of New York
Filed Sept. 28, 1965, Ser. No. 490,961
10 Claims. (Cl. 333—18)

ABSTRACT OF THE DISCLOSURE

A preset time-domain equalizer for a digital data transmission system is made adaptive during message transmission to error patterns monitored in an associated error control circuit. Positive and negative error direction information derived from the error control circuit is correlated with symbol polarities and averaged in reversible counters. Counter overflows in either direction in turn control incrementation of tap attenuators in the equalizer to optimize the error rate of the system.

This invention relates to the correction of the distorting effects of transmission channels of limited frequency bandwidth on digital data intelligence signals and in particular to an improvement on the preset automatic equalizer disclosed in the copending joint patent application of F. K. Becker, R. W. Lucky and E. Port, Ser. No. 396,836 filed Sept. 16, 1964, now Patent No. 3,292,110, issued Dec. 13, 1966. This improvement enables the automatic equalizer to adjust itself optimally during normal message data transmission when transmission channel characteristics change with time. According to this invention, continuous adaptive correction of equalizer adjustments is based on coordination with a forward-acting error control system.

In another copending patent application of F. K. Becker, Ser. No. 459,659 filed May 28, 1965, a high-speed multilevel vestigial sideband data transmission system is disclosed which combines the bandwidth economies of vestigial sideband modulation, the delay and amplitude equalization capabilities of the preset automatic transversal filter equalizer of the cited joint application and the error detection and retransmission control disclosed in the further copending application of H. O. Burton, Ser. No. 429,386 filed Feb. 1, 1965. By this combination it has been found possible to maximize the effective data rate of a viceband telephone transmission line at a level of 9600 bits per second and at the same time maintain an accuracy of $10^{-4}$ errors per bit.

The substance of the above-mentioned Becker and Burton applications is further disclosed in the Conference Record of the First IEEE Annual Communication Convention of June 1965 in papers respectively entitled "An Exploratory, Multilevel Vestigial Sideband Data Terminal for Use on High-Grade Voice Facilities" at pages 481 through 484 and "An Error Control System for Use With a High-Speed Voiceband Data Set," coauthored by E. J. Weldon, Jr., at pages 489 and 490.

Under ideal conditions the preset equalizer of the cited Becker et al. patent application would reduce each error sample at the taps on the transversal equalizer to zero. Unfortunately, however, because of noise and instrumentation limitations the output response samples in practice do not end the preset test pulse period within one incremental attenuator step of zero. In addition, of course, there is also the time variation of channel characteristics during normal message transmission. The small residual equalizer error leads to intersymbol interference and causes the data system to be pattern sensitive. Some sequences of input data are thus more likely to result in output errors than other sequences. The error control unit associated with the multilevel system of the cited Becker application determines the location of such control unit can be made to yield information about the particular patterns which are prone to error and the direction of such error. This information, according to this invention, can be correlated with the attenuator settings of the transversal equalizer to bring the output response samples within one incremental attenuator step of zero and hold them at optimum values during message transmission.

It is an object of this invention to improve and refine the equalization capability of the preset automatic equalizer of the cited Becker et al. patent application.

It is another object of this invention to coordinate error control and equalization functions in a multilevel digital data transmission system.

It is a further object of this invention to render preset automatic equalization for a digital data transmission adaptive to time variations in the attenuation and delay characteristics of a transmission channel during normal message operation.

According to this invention, initial attenuator settings of a transversal filter equalizer in a digital data transmission system are refined and continually updated adaptive to information supplied by an error control associated with the system. Whenever an error is corrected by the error control unit, the direction of the error and the polarities of the surrounding symbols are observed. By direction of the error is meant whether a given symbol has been elevated to the next higher encoding amplitude level or dropped to the next lower encoding amplitude level. An elevation in level is regarded as the positive direction and vice versa. Data symbols are assumed to be encoded in a range of amplitude levels extending symmetrically from the zero level in both positive and negative senses. Each error direction components is correlated with the polarities of surrounding symbols to obtain correction signals to be applied to the attenuators of the transversal filter.

Any individual error direction component is likely to be unreliable, however, due to accompanying noise. Certainly, one sample will not reveal the sequence which is more error prone than normal. Therefore, successive correction signals are averaged by counting in reversible counters for which maximum positive and negative counts are established. Only upon the accumulation of one or the other of these maximum counts is the corresponding equalizer attenuator advanced or retarded one incremental step. At the same time the affected counter is reset to a neutral condition. The polarity of the correction signal corresponding to the symbol occurring a given number of symbols before or after the error component from which the correction signal was derived is fed to the attenuator for the equalizer tap located the given number of time intervals after and before the reference tap on the equalizer.

A feature of this invention is the substitution of the already available buffer register in the error control unit and auxiliary coordination apparatus for the separate shift register required in the preset automatic equalizer for control of the adjustable attenuators of the transversal filter.

Further objects and features of this invention will become apparent from a study of the following detailed description and the drawing in which.

Figure 1:
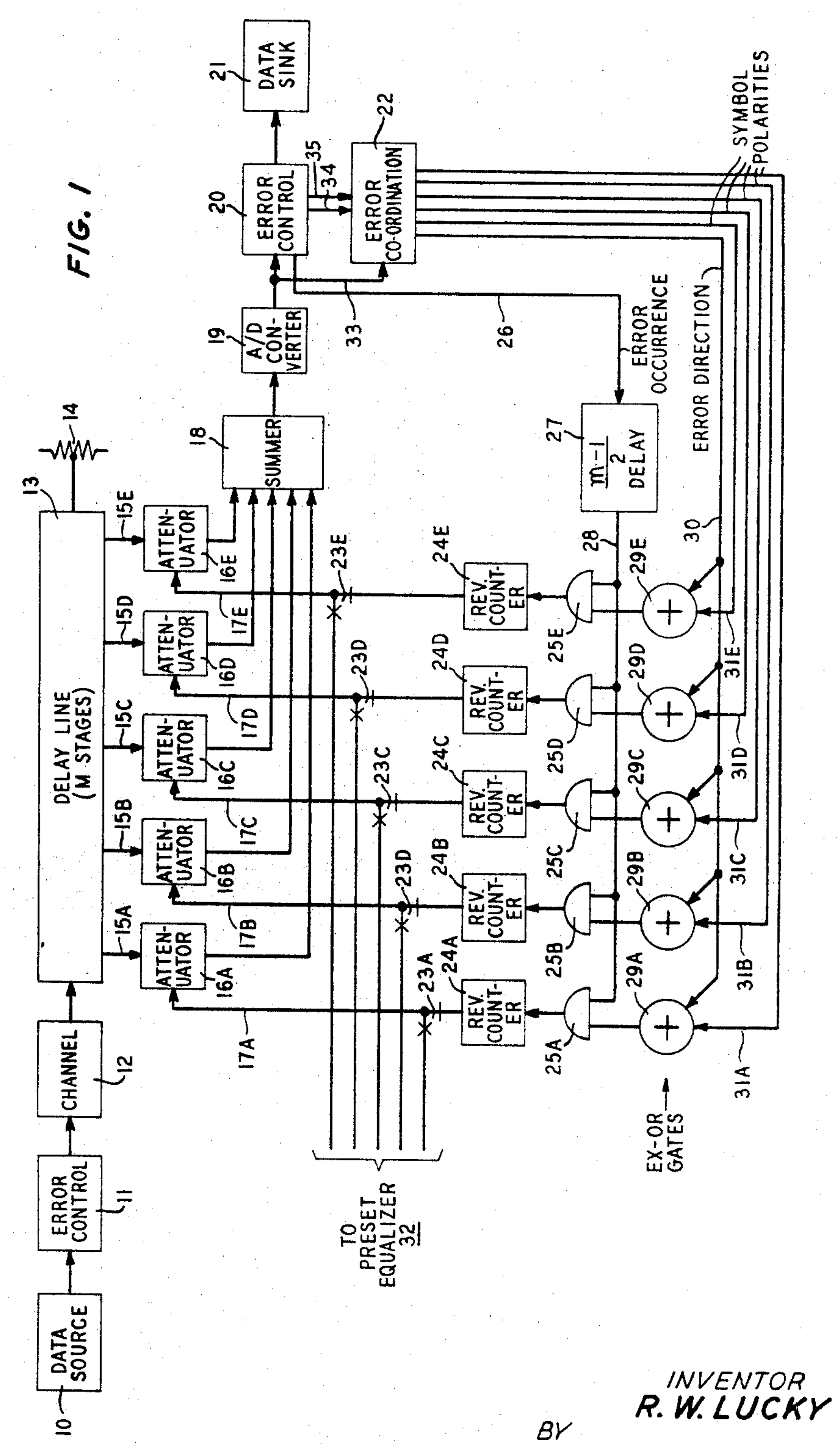
FIG. 1 is a block schematic diagram of the error-coordinated adaptive transversal filter equalization system of this invention.

FIG. 1 represents the pertinent parts of the multilevel data transmission system disclosed in the aforesaid Becker application with those modifications according to this invention which render the automatic equalization system adaptive during normal message data transmission to the occurrence of persistent error patterns. Data source 10 generates high-speed serial data for transmission over a relatively narrow-band transmission channel 12 for ultimate delivery to data sink 21 at a remote location.

Multilevel encoding, as used herein, means encoding on more than two levels per symbol.

The serial data emanating from source 10 is encoded in multilevel form in the well known reflected binary code attributed to F. Gray as disclosed in the cited Becker application for adaptation to the narrow bandwidth of channel 12. For illustrative purposes it is assumed that sixteen-level encoding is used. Half the levels are positive and half, negative. A four-digit binary number serves to designate each encoding level. The specific advantage of the reflected binary code over the natural binary code is that single level errors involve a change in only one digit. Further, whether the level is positive or negative is indicated by the first digit only. Each transmitted symbol encodes one four-digit binary word.

The associated forward-acting error control system represented by an encoding section at the transmitting terminal as error control 11 and by a decoding section at the receiving terminal as error control 20 is of the type disclosed in the above-mentioned Burton application.

In this specific error control system parity check digits are computed from each block of message bits in error control 11. The receiver, in error control 20, recalculates the parity check digits, compares them with the transmitter-computer parity check digits, and uses the resultant information to correct any errors, up to a maximum number of errors per transmitted block, which have occurred during transmission. Sufficient buffer storage is provided at both transmitting and receiving terminals to permit detection and correction of errors to be accomplished without source 10 or sink 21 being aware of it. This type of error-correcting system is called forward-acting.

When the system error-correcting capacity is exceeded, error control unit 20 can request retransmission of data words or blocks in error. However, this backward-acting aspect of the example error-control system is incidental to the operation of the adaptive equalizer disclosed herein.

Since it is desired to transmit multilevel symbols over channel 12 at the highest possible rate, a transversal filter is provided at the receiving terminal to compensate the amplitude and phase distortions introduced into the system by the channel. The transversal filter operating as a time-domain equalizer comprises plurally tapped delay line 13 terminated nonreflectively in characteristic impedance 14, an adjustable attenuator 16 for each tap 15 and summation circuit or summer 18. With a tap spacing commensurate with the data symbol interval the impulse response to each symbol at sampling times is available at the several taps. By proper adjustment of attenuators 16 the net contribution of all taps 15 except that of reference tap 15*c* to the output of summer 18 can be reduced as optimally close to zero as the range of delay line 13 will permit. Attenuators 16 are constructed to be adjustable in incremental steps under the control of reversible counters in a step-by-step procedure. The initial adjustment is made according to the principles of the cited Becker et al. application responsive to a plurality of test pulses transmitted through channel 12 before each data message. For this purpose circuits 32 from a preset equalizer apparatus (not shown) constructed according to the teachings of that application are shown connected through the make portions of contacts 23 to attenuator control leads 17.

Further adjustments are made during the course of message transmission according to the teachings of this invention by the remaining apparatus shown in FIG. 1. At the commencement of message transmission transfer contacts 23 are operated to close the break portions of the contacts by means not shown but readily provided in a practical embodiment.

The output of summer 18 is first converted from multilevel analog form in converter 19 into serial digital data. The serial data is supplied to error control 20 to check for errors in transmission. Whenever an error is detected and corrected, a signal appears also on lead 26. Error coordination circuit 22 has been monitoring the serial data output of converter 19 available on lead 33 and the contents of the buffer registers in error control 20 made available over leads 34 and 35. Coordination circuit 22 furnishes the symbol polarity of the data symbol in error as well as the polarities of data symbols occurring before and after the symbol in which an error has been detected over leads 31 to attenuator control circuitry described below. Coordination circuit 22 also determines the positive or negative direction of the error detected by error control 20 and furnishes a corresponding signal on lead 30 to the attenuator control circuitry.

The attenuator control circuitry comprises an exclusive-OR gate 29 for each attenuator to correlate the error direction signal on lead 30 with the symbol polarities of neighboring symbols on leads 31, a delay unit 27 to align the error occurrence signal on lead 26 with the effective present symbol in error, a reversible counter 24 for each attenuator having an output each time its maximum positive or negative count is reached, and an AND-gate 25 for gating the outputs of exclusive-OR gates 29 to storage counters 24 on each error occurrence. Each of these components is well known in the art and no detailed description is believed necessary.

The operation of the attenuator control circuitry can be explained by means of a specific example. The four-digit Gray code for the decimal digits zero to fifteen is set out in Table I below. Each decimal number corresponds to a coding level. The natural binary digits are shown for comparison in the right hand column.

TABLE I

| Decimal Digit | Gray Code Digit | Natural Binary Digit |
|---|---|---|
| 15 | 1000 | 1111 |
| 14 | 1001 | 1110 |
| 13 | 1011 | 1101 |
| 12 | 1010 | 1100 |
| 11 | 1110 | 1011 |
| 10 | 1111 | 1010 |
| 9 | 1101 | 1001 |
| 8 | 1100 | 1000 |
| 7 | 0100 | 0111 |
| 6 | 0101 | 0110 |
| 5 | 0111 | 0101 |
| 4 | 0110 | 0100 |
| 3 | 0010 | 0011 |
| 2 | 0011 | 0010 |
| 1 | 0001 | 0001 |
| 0 | 0000 | 0000 |

Each four-digit word defines a particular transmitted symbol level out of a possible sixteen. Levels zero through seven are negative and levels eight through fifteen, positive. It will be noted that, in contrast to the natural binary code in which up to three bits change in going from one level to another, as from level eight to level seven, only one bit changes in the Gray code. Therefore, monitoring of errors in the Gray code is simplified.

Assume the following serial message is decoded at the receiver in blocks of four bits, each representing a data symbol:

0011 1011 1X10 0110 0001

Error control 20 detects an error in the center group 1110 at the second bit position (indicated by the obliterating X). The remaining groups are all stored in its buffer register. The polarities of all symbols including those occurring before and after the symbol in error are ascertainable from the first bit thereof. By a comparison of the symbol in error with the correct symbol after detection and correction by error control unit 20, it is determined that the correct symbol is 1010. From the Gray code it is apparent that transmitted level 12 has been incorrectly received as level 11. Thus, the direction of the error is negative.

The error polarity is now correlated with each of the symbol polarities and the results entered into storage counters. This correlation establishes the direction in which the equalizer attenuators must be stepped to reduce the probability of the recurrence of this same error. In this example the polarities of the five successive symbols shown (−++−−) are correlated with the negative error direction and counters corresponding to symbols 1, 4 and 5 are each increased by one count, while counters 2 and 3 are correspondingly decreased by one count. A consistent positive or negative correlation between a given symbol polarity and error direction to the limit of the predetermined maximum number of counts in a given storage counter causes the corresponding tap gain to be changed by one incremental step. Ideally there should be a net zero correlation between error directions and symbol polarities for optimum equalization. Corrections applied to the center reference attenuator-counter 16C operate on the peak impulse response component in the nature of an automatic gain control.

The error directions are correlated with the symbol polarities in exclusive-OR gates 29 in FIG. 1. Exclusive-OR gates, as is well known, are comparison circuits producing complementary outputs depending on whether all inputs are alike or unlike. The outputs of these gates are further gated to reversible counters 24 through AND-gates 25 at the proper time under the control of an error occurrence pulse on lead 26 after delay in unit 27. Reversible counters 24 average the correlated corrections over a range of counts to insure reliability of the indicated error correction and prevent random apparent errors from disturbing the attenuator settings unnecessarily.

Figure 2:
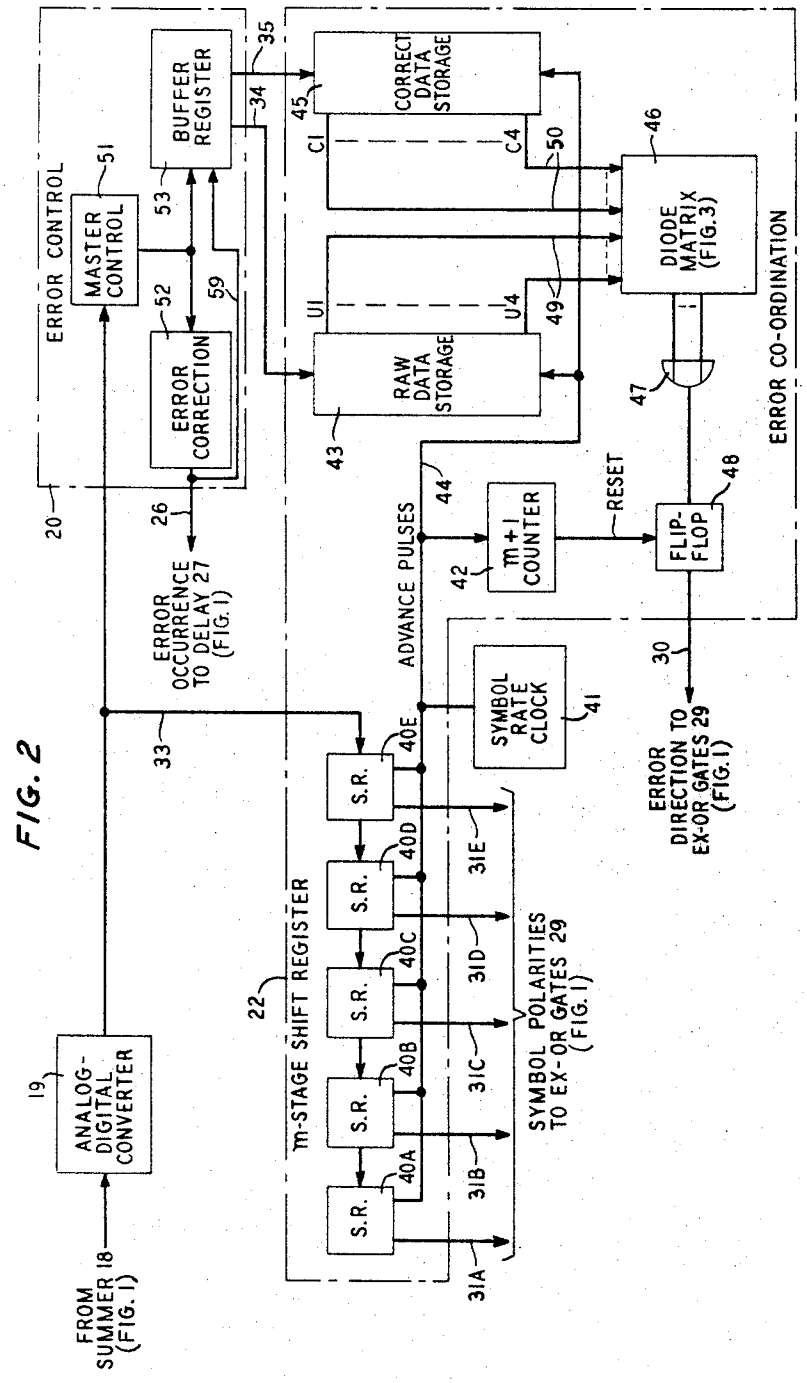
FIG. 2 is a block schematic diagram of an illustrative embodiment of the error coordination apparatus of this invention.

FIG. 2 is an illustrative embodiment of a practical error coordination circuit 22 useful in the equalization system of FIG. 1. Analog signals from summer 18 of FIG. 1 are converted in converter 19 into a serial train for application to error control 20. Error control 20 (shown in broken line outline) includes, as is described in more detail in the cited Burton et al. application, a master control 51, a buffer register 53 with storage of up to 200 bits derived from adjacent symbols, and an error correction circuit 52. The master control directs the operation of buffer register 53 and error correction circuit 52. Error correction circuit 52 recomputes parity digits and compares these digits with the transmitted parity digits to detect and correct errors according to known techniques as disclosed, for example, in "Error-Correcting Codes" by W. W. Peterson (John Wiley and Sons, Inc., New York, 1961). Whenever an error is detected and corrected, an error occurrence signal appears on lead 26. This error occurrence signal is also furnished on lead 59 to be combined modulo-two fashion at the proper instant with the uncorrected raw data stored therein as the latter is shifted under the control of master control 51 into a utilization circuit, such as data sink 21. For the purposes of this invention the uncorrected received data stored in register 53 is made available on lead 34 and the corrected data, on lead 35. In the absence of corrections the data appearing on leads 34 and 35 will be identical.

The serial output of converter 19 appears also on lead 33 for application to error coordination circuit 22 as shown at the left in FIG. 2. The latter circuit includes an m-stage shift register 40, data storage registers 43 and 45, diode matrix 46, OR-gate 47, flip-flop 48, and $(m+1)$-stage counter 42. The quantity $m$ corresponds to the number of taps on delay line 13 in FIG. 1. An external symbol rate clock 41 is also presumed available in the system. This clock is coordinated with the received signal transitions in any conventional manner.

The purpose of shift register 40, five stages of which are shown in FIG. 2, is to store continuously the most significant polarity indicator bit of each successive received data symbol. Accordingly, advance pulses from clock 41 occur only every fourth serial bit (for a four-bit sixteen level encoding). Therefore, only the most significant polarity bits are effectively stored in register 40. Center stage 40C stores the present symbol polarity bit and corresponds to the center reference tap 15C on delay line 13. The contents of stages 40A and 40B correspond to past polarity bits and that of stages 40D and 40E, to effective future polarity bits. The outputs of the separate stages appear on leads 31A through 31E for application to exclusive-OR gates 29 in FIG. 1.

Storage units 43 and 45 are also shift registers. They are auxiliaries to the buffer register 53 in error control unit 20 to form a serial-to-parallel conversion of the Gray coding for each symbol determined to be in error. The uncorrected symbol as received is obtained directly from the output of buffer register 53 in error control 20 by way of lead 34 and is stored in unit 43, which has outputs on leads 49. For a four-bit encoding the separate digits are represented as bits U1 through U4. Correspondingly the corrected symbol is obtained from buffer register 53 in error control 20 by way of lead 35 after modulo-two addition with the error-occurrence signal appearing on lead 59 and is stored in storage unit 45, having separate bit outputs on leads 50. The separate digits are represented as C1 through C4 for a sixteen-level symbol.

The corrected symbol bits C1–C4 are compared with the corresponding uncorrected symbol bits U1–U4 in diode matrix 46 to determine whether the symbol in error was raised or lowered in amplitude and consequently whether the error is positive or negative. For simplicity matrix 46 is arranged to detect only decreases in amplitude or negative errors. All outputs are combined in buffer OR-gate 47, which produces one output if a positive or no error occurred and a complementary output for a negative error. A negative error output sets flip-flop 48, whose output then stores the error direction information. Its output appears on lead 30 for application to other inputs of exclusive-OR gates 29 in FIG. 1. Flip-flop 48 is reset periodically as each symbol traverses delay line 13 by means of $(m+1)$-stage counter 42 driven by symbol-rate clock 41.

Figure 3:
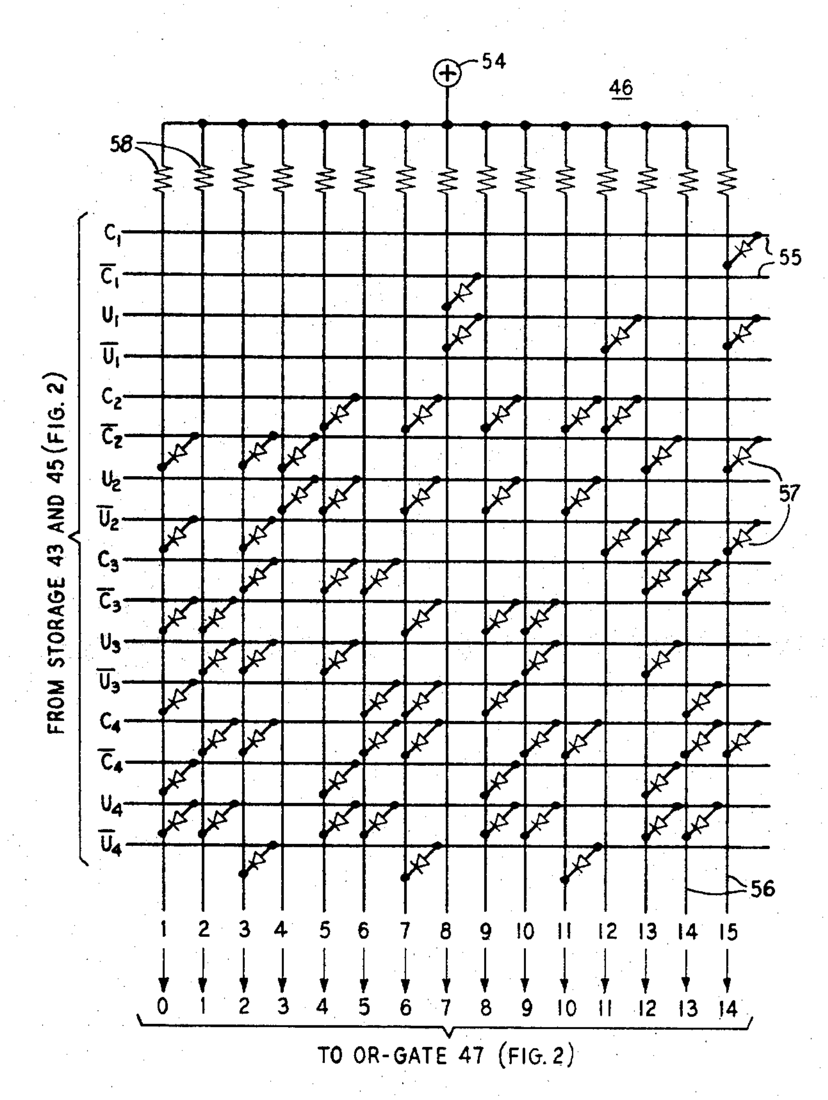
FIG. 3 is a representative illustrative embodiment of a diode matrix useful in the determination of error direction from a correlation of uncorrected and corrected received data.

Diode matrix 46 for determination of error direction can advantageously be constructed as shown in FIG. 3. The matrix comprises a plurality of horizontal row lines 55, a plurality of vertical column lines 56, a bias source 54, a dropping resistor 58 for each column line 56, and a plurality of diodes 57 selectively located at crosspoints of the row and column lines. All column lines 56 are positively biased by source 54 through resistors 58. The row lines 55 are provided as shown with complementary inputs from raw and correct data storage units 43 and 45 of FIG. 2. Thus the potentials on row lines 55 correspond selectively to the corrected and uncorrected Gray code bits of each data symbol. For the assumed four-bit encoding sixteen inputs are provided. Column lines 56 are output lines. An output on any column line indicates an error which causes a one-level decrease in symbol amplitude. An output on the leftmost line indicates a reduction from level one to level zero; on the second line, a reduction from level two to level one; and so forth as indicated at the bottom of FIG. 3.

An examination of the Gray code in Table I reveals by inspection what bit changes must be monitored to indicate changes from level to level. For example, a change from level eight to level seven is uniquely indicated by an inversion of the most significant correct digit "1" to an incorrect digit "0." Thus, in the matrix a diode is placed at each of the crosspoints on the 8-to-7 column line with the uncorrected U1 bit and the corrected and complemented $\overline{C1}$ bit. Column line 8-to-7 is therefore positive. Diodes are arranged at a crosspoint of each of the other column lines with the several row lines to render them negative. For example, the complement of bit U2 renders column lines 1, 3, 12, 13 and 15 negative. Similarly, the complements of other bits render the other column lines negative.

In the example case of level twelve being reduced to level eleven by a negative error, column line 12 is made positive by bits U1, C2, and $\overline{U2}$. Column 8 is made negative by the complement of bit C1; columns 1, 3, 4, 13 and 15, by the complement of bit $\overline{C2}$; columns 5, 6 and 14, by the complement of bit C3; columns 2 and 10, by the complement of bit U3; columns 7 and 11, by the complement of bit C4; and column 9, by the complement of bit U4. Diodes 57 in FIG. 3 are selectively placed to perform similar functions for all other negative errors. The matrix produces no change in output for non-errors or positive errors.

The principal disturbance that produces errors is background noise. This is unlikely to cause any but one-level amplitude changes. This is found to be true in better than 99 percent of the cases. Therefore, level changes greater than one level are not monitored in this embodiment. The small percentage of greater level changes can of course be monitored according to the principles of this invention nevertheless at the cost of a more complex diode matrix.

The general principles of adaptive equalizer adjustment have been more fully disclosed in another copending application entitled, "Adaptive Equalizer for Digital Transmission System," Ser. No. 460,794 filed by me on June 2, 1965, now Patent No. 3,368,168 issued Feb. 6, 1968.

While this invention has been disclosed by means of a particular illustrative embodiment, the principles of this invention are nevertheless susceptible of a wider range of application as will be apparent to those skilled in the art.

What is claimed is:

1. In combination with a multilevel data transmission system including error detection and forward-acting correction means and a transversal filter with attenuators initially adjusted for optimum compensation of transmission line distortion means for readjusting the attenuators in said transversal filter automatically in cooperation with the detection of errors by said error detection means during message data transmission comprising, means comparing the level of each data symbol in error with that of the correct symbol to determine an error direction, means storing the polarities of message symbols preceding and following the symbol in error, means correlating the error direction from said comparing means with each of the polarities in said storing means, counting means for averaging the several correlated error directions from said correlating means over a predetemined number of counts, means coordinated with said correction means for gating said correlating means to said counting means upon the occurrence of each error, and means responsive to overflow counts in said counting means for incrementally readjusting the attenuators in said transversal filter in a direction opposite to the correlated error direction.

2. Apparatus for adaptively and continuously readjusting the attenuators in a transversal equalizer connected to a distoring transmission channel during message data transmission comprising error control means operating on the output of said transversal equalizer to detect and correct errors by parity checking of blocks of data, buffer storage means in said error control means for a plurality of successive data symbols, means comparing symbols in error with corrected symbols to determine the direction of each error, means correlating the error direction from said comparing means of a symbol in error with the polarities of symbols preceding and following the symbol in error derived from said storage means, means coupled to said correlating means and provided with maximum positive and negative counts for averaging succesive error occurrences, overflow signals of opposite sense resulting from attainment of said maximum counts, and means responsive to said overflow signals for incrementing appropriate attenuators in said transveral equalizer.

3. In combination with a transmission channel of limited bandwidth, a transversal filter having a plurality tapped delay line, an incrementally adjustable attenuator in series with each tap and a common summing point, and an error control for detecting and correcting errors in individual message symbols.

means continuously readjusting said attenuators for optimum equalization responsive to the direction of errors detected by said error control comprising, error coordination means connected to said common summing point and to said error control, first means in said error coordination means for storing the polarities of successive symbols appearing at said common summing point, second means in said error coordination means determining a direction for each error detected by said error control by comparing the amplitude of the symbol in error with the corrected symbol, means correlating the direction of each error obtained from said second means with the polarities of symbols preceding and following the symbol in error obtained from said first means, reversible counters having predetermined maximum and minimum counts producing oppositely directed overflow outputs on attainment of such counts, means responsive to an error occurrence signal from said error control for gating signals from said correlating means to said reversible counters, and means applying overflow outputs from said counters to the attenuators in said transversal filter to increment said attenuators in a direction to oppose the correlated error direction.

4. The combination of claim 3 in which said first means comprises a multistage shift register storing the most significant binary digit in a multidigit code representing each data symbol traversing said common summing point.

5. The combination of claim 3 in which said second means comprises a diode matrix.

6. The combination of claim 5 in which said diode matrix comprises a horizontal line for each digit and its complement of the multidigit code representing each data symbol in error and the corrected symbol, a vertical line for each possible one-coding level change resulting from transmission distortion, means for biasing each vertical line in a particular sense, a diode at each crosspoint between superposed horizontal and vertical lines required by inspection of the changes in digits between multidigits encoding of successive transmitted amplitude levels to obtain an error-direction output on the vertical line representing the particular level change caused by the detected error and a blocking output on all other lines, and a buffer gate connected to all said vertical lines having a significant output whenever any of said vertical lines exhibits an error-direction output.

7. The combination of claim 3 in which said correlating means comprises exclusive-OR gates having significant outputs only when the inputs are opposites.

8. The combination of claim 3 in which said reversible counters include resetting means activated on the attainment of either maximum count.

9. The combination of claim 3 in which said gating means includes delay means for aligning signals from said correlating means with the appropriate attenuator in said transversal filter to be incremented.

10. Apparatus for adaptively maintaining optimum settings for the attenuators in a transversal equalizer by monitoring errors in multilevel message data symbols transversing a distorting transmission channel comprising error control means repeatedly determining the presence of errors in received data symbols and regenerating correct symbols, means repeatedly comparing symbols in error with the correct symbols to determine the direction of the error, means continuously storing polarities of successive message data symbols, means repeatedly correlating error directions from said comparing means with the stored polarities of data symbols occurring before and after each error, means separately counting the correlated error directions up to predetermined maximum counts and producing control outputs when maximum counts are attained, and means responsive to said control outputs for adjusting said attenuators step-by-step in a direction to reduce the probability of further such errors.

No references cited.

HERMAN KARL SAALBACH, *Primary Examiner.*

M. NUSSBAUM, *Assistant Examiner.*